Figure 1:
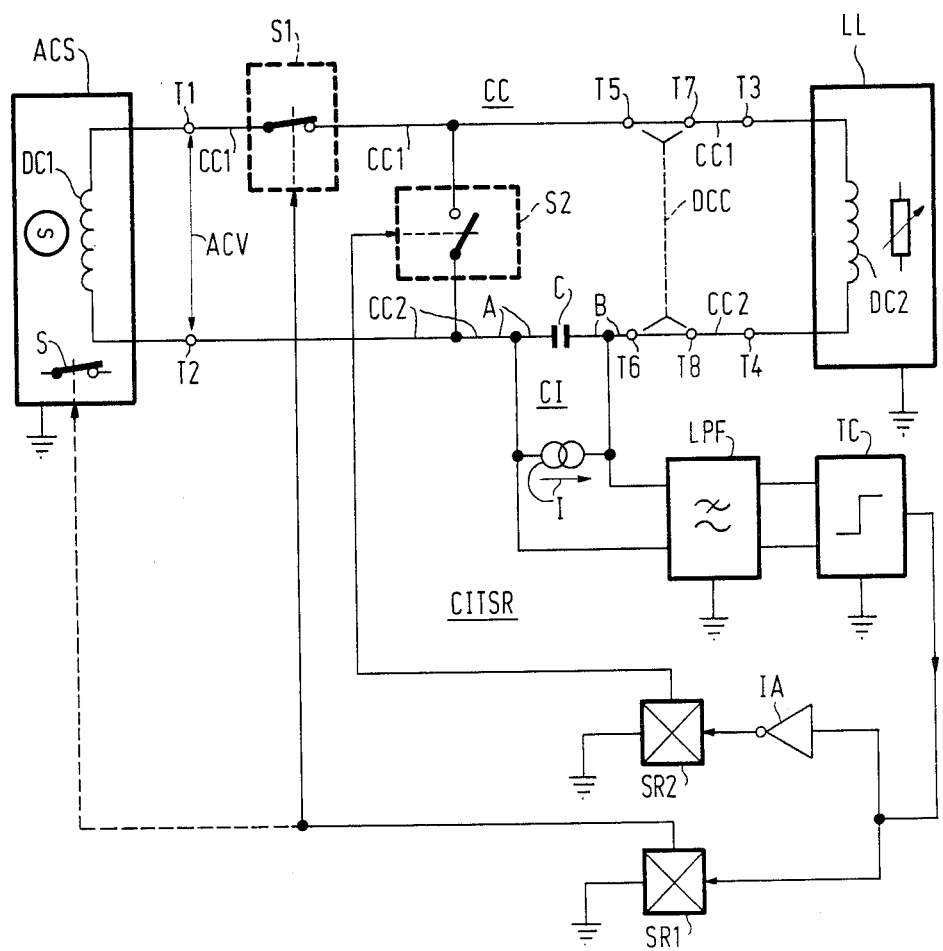

United States Patent [19]

Schmale et al.

[11] Patent Number: 4,523,248
[45] Date of Patent: Jun. 11, 1985

[54] SAFETY CIRCUIT FOR A DETACHABLE CONNECTING CABLE

[75] Inventors: Peter C. Schmale; Marinus C. W. Van Buul, both of Breda, Netherlands

[73] Assignee: U.S. Philips Corporation, New York, N.Y.

[21] Appl. No.: 499,599

[22] Filed: May 31, 1983

[30] Foreign Application Priority Data

Jun. 4, 1982 [NL] Netherlands ............ 8202259

[51] Int. Cl.³ .............................................. H02H 3/20
[52] U.S. Cl. ........................................ 361/1; 361/47; 361/49; 315/241 P; 354/145.1
[58] Field of Search ............... 361/47, 48, 49, 50, 361/1; 354/145.1; 315/241 P, 362, 119

[56] References Cited

U.S. PATENT DOCUMENTS 3,697,809 10/1972 Self ........................................ 361/47
4,204,140 5/1980 Willis .............................. 354/145.1 X
4,369,395 1/1983 Stempeck ...................... 315/241 P
4,410,925 10/1983 Tucker et al. ...................... 361/49 X Primary Examiner—Reinhard J. Eisenzopf
Attorney, Agent, or Firm—Robert T. Mayer; Bernard Franzblau

[57] ABSTRACT

A power supply system comprising an a.c. voltage source (ACS), a load (LL) and a detachable (DCC) cable connection (CC). In order to prevent a dangerously high a.c. voltage from occurring between cable conductors (CC1, CC2) when the cable connection is loose, a safety circuit (CITSR) is provided which includes an on/off switching circuit (S1, SR1, S2, SR2). The safety circuit (CITSR) includes a parallel arrangement (CI) of at least one capacitor (C) and a direct current source (I). The parallel arrangement (CI) is part of a direct current circuit (CC2, DC2, CC1, S1, DC1, CC2) which is closed via the cable conductors (CC1, CC2), the a.c. voltage source (ACS) and the load (LL). The parallel arrangement (CI) is coupled to the on/off switching circuit (S1, SR1, S2, SR2) via a threshold circuit (TC). When a controllable a.c. voltage source (ACS) is used to produce a low voltage (30 V) before a high voltage (700 V) is supplied, it is first detected whether there is a high-ohmic load or a short-circuit between the cable conductors.

19 Claims, 6 Drawing Figures

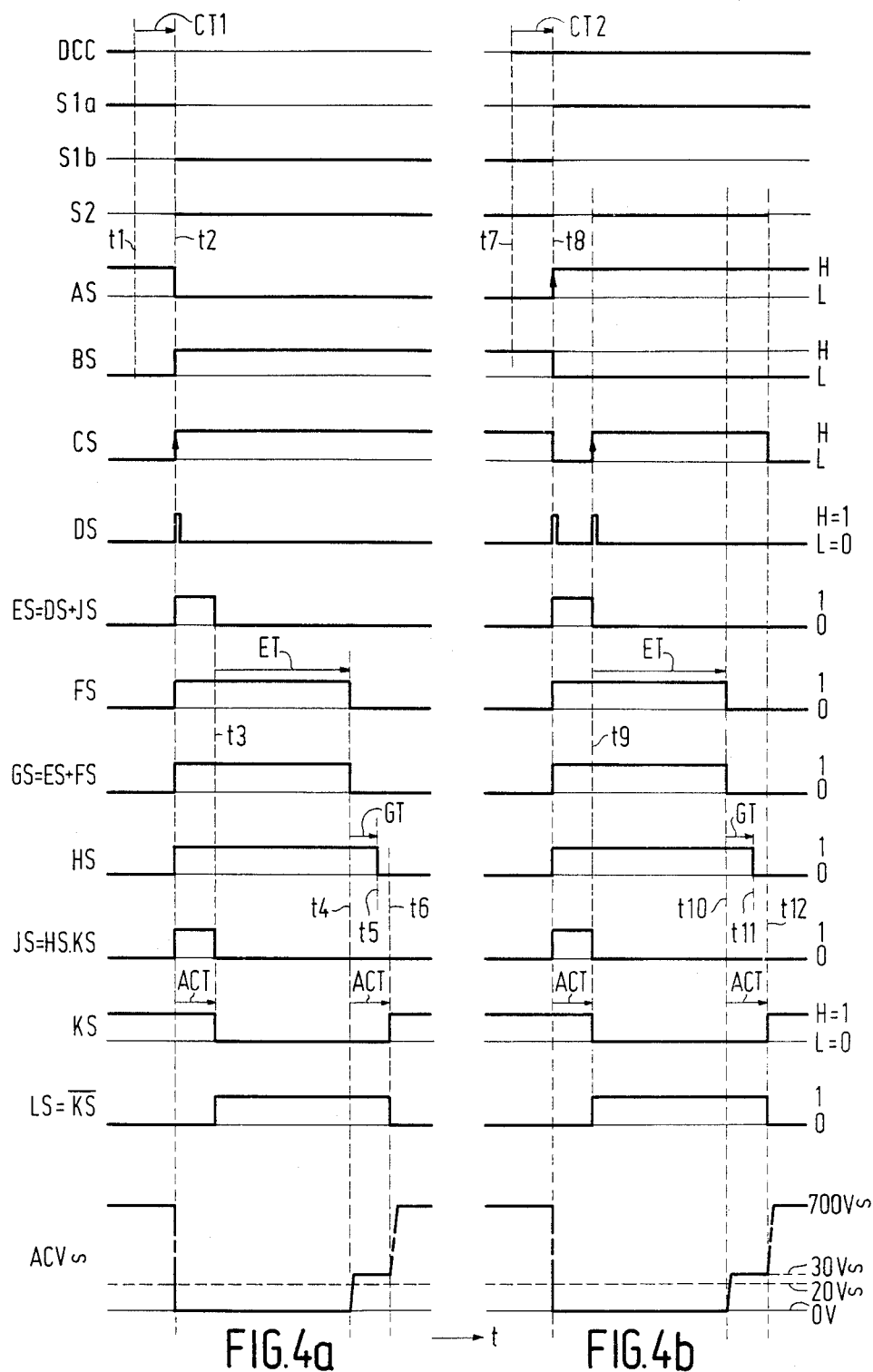

SAFETY CIRCUIT FOR A DETACHABLE CONNECTING CABLE

The invention relates to a power supply system comprising an a.c. voltage supply source, a load and a connecting cable between the source and the load. The connecting cable has two cable conductors which are coupled to two connecting terminals of the a.c. voltage supply source and the load, respectively, the cable having a detachable cable connection between the load and the a.c. voltage supply source. The power supply system comprises a safety circuit to prevent the AC supply voltage from appearing on the cable conductors in the event the cable connection is in the non-connected state, for which purpose the safety circuit comprises a switching circuit which includes an on/off switch of the power supply system.

Such a power supply system is described in U.S. Pat. No. 4,335,412, wherein a television camera is mentioned as the load which is connected via the connecting cable. The connecting cable is in the form of, for example, a triaxial cable over which further camera control signals and video signals generated by the camera can be transmitted to a camera control and signal processing unit of which the a.c. voltage supply source forms a part. The a.c. voltage between the cable conductors has a value of, for example, hundreds of volts. The fact that the cable is detachable at, for example, the camera, which acts as the load, results in a dangerous situation when the cable is detached by a camera operator, either on purpose or accidentally, or when the cable comes loose, as it is then possible that the high-voltage-carrying cable conductors will be touched.

In order to prevent this dangerous situation from occurring, a safety circuit is provided in the power supply system. The above-mentioned U.S. Patent describes how a supply alternating current detection circuit is provided at the a.c. voltage supply source. In the event that a supply a.c. voltage path is interrupted for one reason or another, for example the cable connection becoming loose, the supply of alternating current is equal to zero and the on/off switch of the cable conductors disconnect the a.c. voltage source. At the load the safety circuit comprises a relay switch which, when no voltage is applied to the load, is de-energized and connects one of the cable conductors to ground via a resistor which is arranged in series with a diode. When the source is switched off this cable conductor is connected to a terminal of the safety circuit to which a voltage is applied which changes in a pulse-shaped manner with positive and negative polarities relative to ground. At the source a measurement is made via the connections to ground as to whether the cable conductor is connected to the load. If so, the a.c. voltage supply source is connected again between the cable connectors, whereafter at the load the relay switch is energized by the applied AC supply voltage, the current measuring circuit is interrupted and power is supplied to the load.

It is apparent that the alternating current delivered by the source provides the information for making the decision to switch off the power supply system. Also, for the decision to switch the power supply system on again, a current measurement via one of the cable conductors and ground provides the information, the load being active, in combination with a relay switch to close the current measuring circuit. The described structure of the safety circuit which comprises the active load, the current measurement via ground and the alternating supply current measurement result in an interference-sensitive protection system. This interference may come from outside the power supply system or may be caused by short-circuited or interrupted circuit components in the power supply system.

In addition, the use of the supply alternating current consumed by the load as the criterion creates problems when a television camera, acting as the load, is in a stand-by state. The current consumed may then be so low that it is erroneously inferred that the cable connection is interrupted.

It is an object of the invention to provide a power supply system comprising a safety circuit, the load remaining passive, no measurement via ground being effected and wherein switching off the power supply system does not depend on the alternating current taken from the source. According to the invention, a power supply system is characterized in that the safety circuit includes a parallel arrangement of at least one capacitor and a direct current source in a direct current circuit which comprises a direct current path between the connecting terminals of the a.c. voltage supply source and the load, and the cable conductors connected thereto, respectively. The said parallel circuit is coupled via a threshold circuit having a threshold voltage value to the switching circuit comprising the on/off switch of the power supply system. The switch is switched-on or switched-off, respectively, before or after, respectively, the threshold voltage value is exceeded by the voltage across the said parallel arrangement.

The fact that the direct current delivered by the direct current source can no longer flow in the said direct current circuit which is interrupted at the cable connection results in a voltage increase across the capacitor terminals which, when the threshold value of the threshold circuit is exceeded, results in an interruption of the a.c. voltage supply to the conductors of the connecting cable. Detaching or loosening of the cable connection then always results in an interruption of the a.c. voltage.

In order that the power supply system be rapidly switched off, an embodiment of a power supply system in accordance with the invention is characterized in that the said parallel arrangement is coupled to the threshold circuit via a low-pass filter which has a pass band located below the AC supply voltage frequency.

Now the threshold value of the threshold circuit can be fixed at a d.c. voltage which is lower than the a.c. voltage drop across the capacitor produced by the alternating current supply, which a.c. voltage drop, becoming a smoothed ripple voltage, does not influence the threshold circuit.

Switching off the power supply system may be effected by switching off the a.c. voltage source. In that case, not only is there no a.c. voltage supplied between the said two connecting terminals, but there is also no a.c. voltage between further connecting terminals of the a.c. voltage source. It may however be desirable to have the supply of a.c. voltage to those further connecting terminals continue. An example thereof is the use in the a.c. voltage source of a transformer having one primary and several secondary windings provided between associated connecting terminals. Switching the primary winding off results in the a.c. voltage supply source being fully switched off. An embodiment of a power supply system in accordance with the invention, in which only the a.c. voltage supply to the detached or loose connecting cable is interrupted, is characterized in that the said on/off switch is provided between the detachable cable connection and at least one of the connecting terminals of the a.c. voltage supply source and the switching circuit comprises a second switch which is arranged as an off/on switch in parallel with a series arrangement of the first-mentioned on/off switch and the connecting terminals of the a.c. voltage source. The said parallel arrangement of the capacitor and the direct current source are provided in a direct current circuit which comprises the direct current path between the connecting terminals of the load, the second switch and at least a portion of the cable connector including the detachable cable connection.

With the aid of the switched-on second switch it is accomplished that the direct current path interrupted by the first switch, in which path the two connecting terminals of the a.c. voltage supply source are present, is shunted by a direct current path. Connecting the detached or loose cable connection results in the formation of a closed direct current circuit and in the capacitor being discharged to below the threshold value at which the second and first switches are switched-off or switched-on, respectively so that the supply of a.c. voltage to the connecting cable is resumed.

In order to ensure that when the cable connection is detached or comes loose the first and second switches are always switched off and switched on, respectively, a simple embodiment of a power supply system in accordance with the invention is characterized in that in the said parallel arrangement the direct current source comprises a series arrangement of a first resistor, a d.c. voltage source and a second resistor, the threshold circuit comprising first and second differential amplifiers each having a (+) and (−) input, unlike inputs of the first and the second differential amplifiers being connected to the said parallel arrangement on the one hand via a first and a second low-pass filter, respectively and on the other hand via a first and a second voltage divider, respectively for producing a threshold voltage value. The outputs of the first and the second differential amplifiers, are connected to first and second switching signal inputs, respectively of the switching circuits associated with the first and the second switches, respectively.

To ensure, for reasons of safety, that an indication is obtained when a short-circuited or interrupted circuit component, with all the that this entails, is present in the system, which indication is the result of the fact that no high supply a.c. voltage occurs between the cable connectors although the connection between the cable and the load is indeed present, a further embodiment in accordance with the invention is characterized in that in parallel with the said parallel arrangement of the capacitor and the direct current source there is a diode bridge circuit. Two opposite bridge terminals thereof are connected to two terminals of a d.c. voltage divider. A third and a fourth differential amplifier are provided each having a (+) and a (−) input, unlike inputs of the third and fourth differential amplifiers being separately connected to the said parallel arrangement or to one of the two terminals of the d.c. voltage divider, respectively. Outputs of the third and fourth differential amplifiers are connected via respective diodes to the inputs, which are connected to the first and second voltage dividers, respectively, of the first and second differential amplifiers, respectively.

To make it possible to obtain an indication that, in the parallel arrangement of the capacitor and the direct current source, the capacitor is short-circuited or interrupted, an embodiment of a power supply system in accordance with the invention is characterized in that the capacitor in the said parallel arrangement is in the form of a series arrangement of first and second capacitors each having substantially the same capacitance. The junction of the first and the second capacitors is connected to a d.c. voltage terminal via a diode.

In this situation an interruption in a capacitor results in the off/on switch being operative under the control of the AC supply voltage in a power supply system which is characterized in that the output of the fourth differential amplifier is connected to the input of the second differential amplifier via a peak rectifier circuit of which the diode connected thereto forms a part.

In order to obtain a further reduction of the ripple a.c. voltage occurring at the first and second differential amplifiers, i.e. in addition to the reduction caused by the low-pass filters, a further embodiment of the invention is characterized in that of the said parallel arrangement a connection to the first and second voltage dividers at the first and the second differential amplifiers, respectively, is connected to a terminal of a bypass capacitor for the AC supply voltage frequency.

It is possible that after a cable connection in, for example, a camera supply system has been detached or come loose, a camera operator produces, for example with a tool, a short-circuit between the cable conductors from which the voltage has been removed. If no further measures are taken, this short-circuit will be erroneously detected in the described power supply system as a camera being connected as a load so that the a.c. voltage supply source is connected between the cable conductors and a possibly rapidly increasing a.c. voltage occurs at the loose, short-circuited cable connection. If now the operator removes the tool and, consequently, the short-circut, he is endangered by the now present rapidly increased a.c. voltage because it takes some time to detect the fact that the cable is unconnected and to again remove the voltage from the cable conductors. This unsafe period may be in the order of magnitude of some tenths of a second.

In order to prevent the described unsafe state from occurring in a power supply system having a rapidly returning high a.c. voltage between the cable conductors, an embodiment of a power supply system in accordance with the invention is characterized in that the power supply system comprises a controllable a.c. voltage supply source suitable for producing a low a.c. voltage and a high supply a.c. voltage. The low a.c. voltage is present after the cable conductors have been connected to the a.c. voltage supply source via the threshold circuit and the switching circuit comprising the switch, whereafter the high AC supply voltage is present after it has been detected at the low a.c. voltage by means of a peak rectifier circuit and a further threshold circuit, that a load which is high-ohmic for the a.c. voltage frequency is connected to the conductors of the connecting cable.

A further protected embodiment is characterized in that a delay device is arranged in series with the peak rectifier circuit and the said further threshold circuit. The delay device has a time delay which is equal to or greater than, respectively, a charging period of the capacitor in the parallel arrangement which is equal to the time required to reach the threshold voltage value of the first-mentioned threshold circuit.

In a power supply system in accordance with the invention, comprising the said two switches, a further protected embodiment is characterized in that two Zener-diodes having opposite conductivity directions are arranged in series with the said second switch. The first-mentioned switch is then of a dual construction including the said on/off switch and with an off/on switch which is arranged in parallel with the two Zener diodes.

In order to prevent the possibility that a nonpermitted sequence at the a.c. voltage control occurs at the controllable a.c. voltage supply source, an embodiment of a power supply system in accordance with the invention is characterized in that the controllable a.c. voltage supply source has two control inputs between which a closed circuit of logic gates is present.

Figure 2:
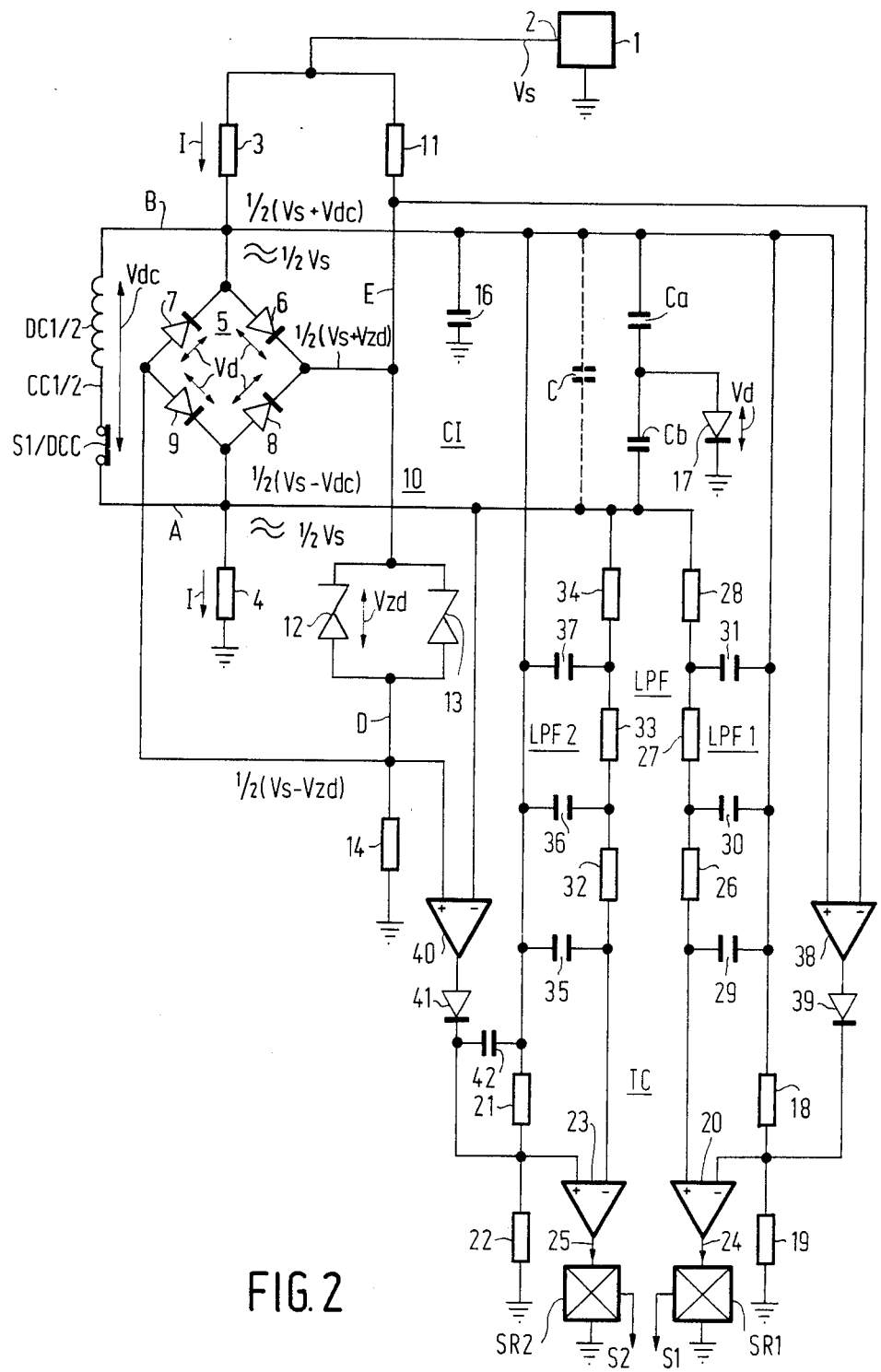
Figure 3:
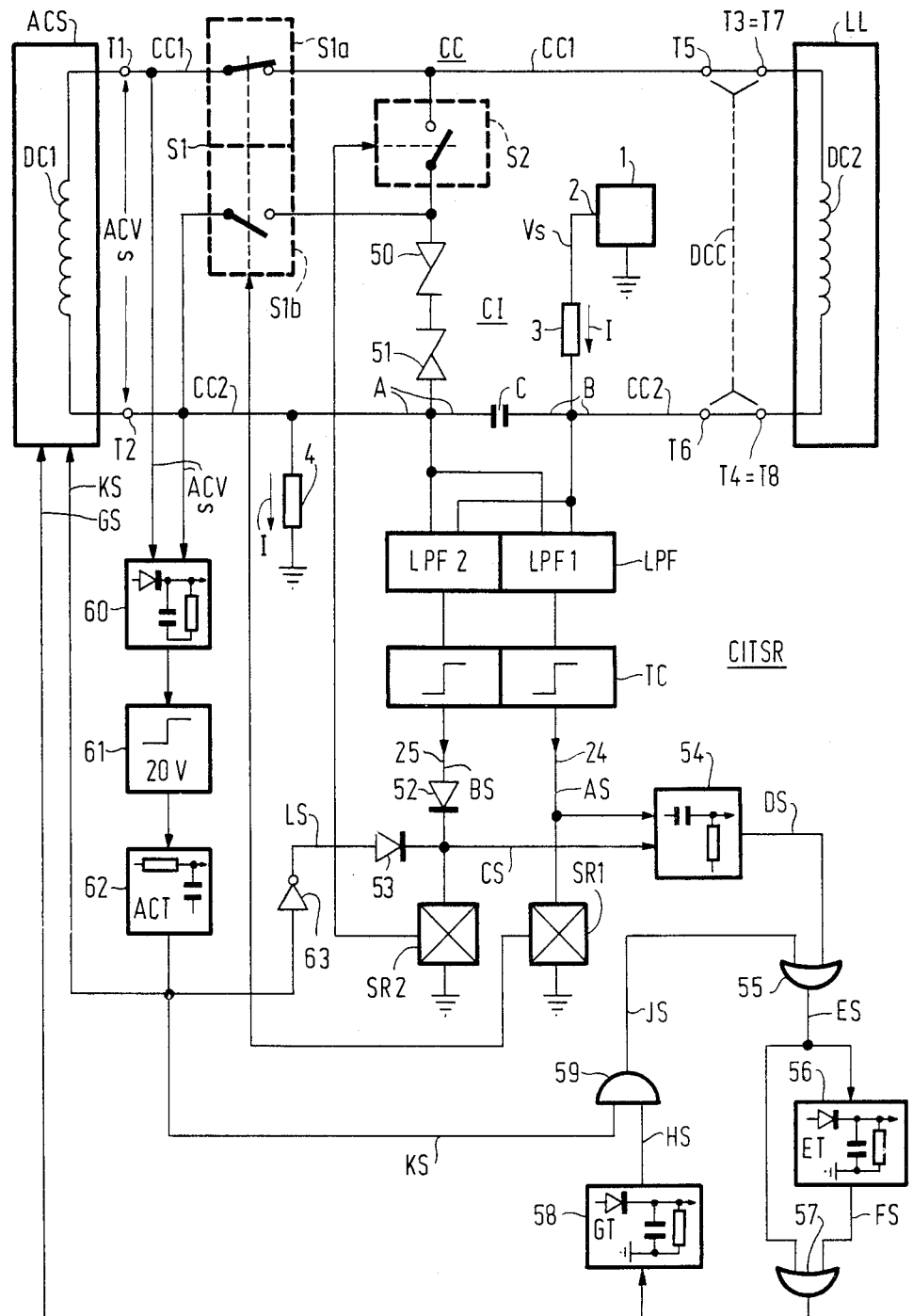
Figure 4C:
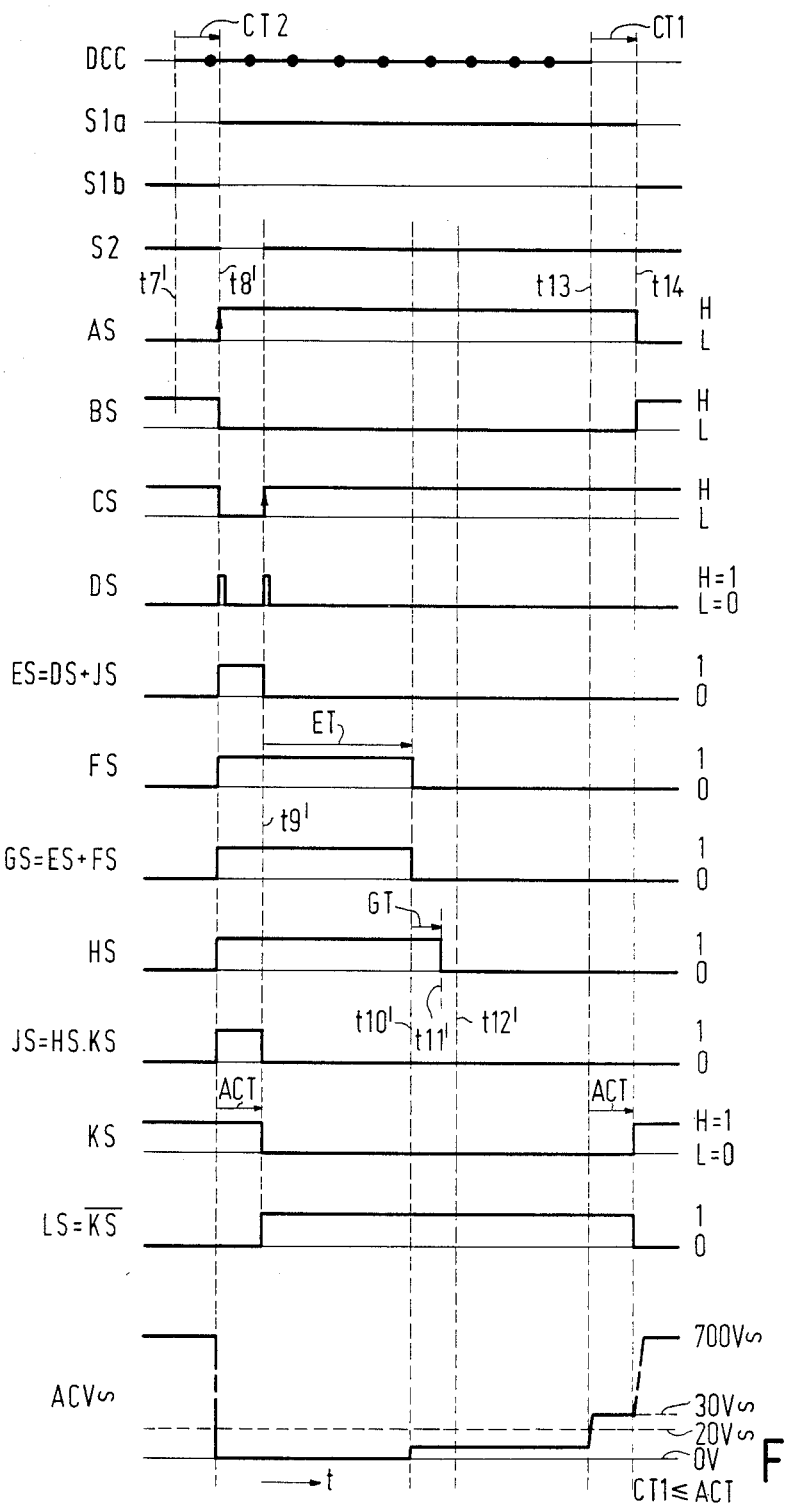

The invention will now be further described by way of example with reference to the accompanying drawings, in which:

FIG. 1 shows an embodiment of a circuit diagram of a power supply system in accordance with the invention comprising a safety circuit, FIG. 2 shows a more detailed circuit diagram of a safety circuit of the supply system of FIG. 1, FIG. 3 shows a circuit diagram of a supply system in accordance with the invention, in which, after the safety circuit has become operative, a short-circuit in the supply system does not result in a dangerously high AC supply voltage, and FIGS. 4a, 4b and 4c illustrate the operation of the supply system of FIG. 3 by means of some time diagrams.

In the circuit diagram shown in FIG. 1 of an embodiment of a power supply system in accordance with the invention, ACS denotes an a.c. voltage supply source, LL a load and CC a connecting cable between the source ACS and the load LL. The connecting cable CC has two cable conductors CC1 and CC2 which, at the source ACS and the load LL, respectively are coupled to two connecting terminals T1, T2 and T3, T4, respectively. At the cable CC a detachable cable connection is designated by DCC. In the drawing the cable connection DCC has four terminals T5, T6, T7 and T8. The terminals T7 and T8 may coincide with the terminals T3 and T4·so that the cable connection DCC is then detachable near the load LL.

The load LL may be, for example, a television camera connected to the a.c. voltage supply source ACS via a, for example, triaxial connecting cable CC having a length of some kilometers. The source ACS may form part of a central camera control and signal processing unit. The television camera acting as the load LL can then apply a video signal to the cable CC.

In the source ACS a direct current path DC1 is present between the terminals T1 and T2. Likewise, a direct current path DC2 is present in the load LL between the terminals T3 and T4. By way of example, the direct current paths DC1 and DC2 are shown including coils which may be in the form of a transformer winding or a choke, it being possible to use a capacitor for blocking the direct current for the case where the coil is a choke. The a.c. voltage supply source ACS produces between the terminals T1 and T2 an a.c. supply voltage ACV which has a value of, for example, 700 V and a frequency of, for example, 400 Hz.

In FIG. 1, S1 denotes an on/off switch and S2 denotes an off/on switch. The switch S1 is present in the cable conductor CC1, and the switch S2 is provided between the cable conductors CC1 and CC2 in parallel with the series arrangement of the switch S1 and the connecting terminals T1 and T2 of the source ACS. When the cable connection DCC is in the conducting state there is further arranged in parallel with the switch S2 the series arrangement of the connecting terminals T3 and T4 of the load LL and of a parallel arrangement CI of a capacitor C and a direct current source I. The terminals of the parallel circuit CI are denoted by A and B. The terminals A and B are coupled to a threshold circuit TC via a low-pass filter LPF which has a passband located below the AC supply voltage frequency. An output of the threshold circuit TC, which operates with a predetermined threshold voltage value, is connected to an input of a relay coil SR1 which is associated with the switch S1. To illustrate this the relay coil SR1 and the switch S1 are coupled to each other in the drawing. The output of the threshold circuit TC is further connected via an inverting amplifier IA to an input of a relay coil SR2 which, in the manner shown in the drawing, is associated with the switch S2. In addition, a possible connection to the a.c. voltage supply source ACS is shown at the relay coil SR1, an on/off switch S being present in the source ACS. The switches S, S1 and S2 and the relay coils SR1 and SR2 together form a switching circuit (S, S1, SR1, S2, SR2). There is also a direct current circuit (CC2, DC2, CC1, S1, DC1, CC2) when the switches S1 and S2 are closed and open, respectively, and a connected cable connection DCC, whereas a direct current circuit (CC2, DC2, CC1, S2, CC2) is present when the switches S2 and S1 are closed and open, respectively, and the cable connection DCC is in the connected state. For the sake of completeness, connections to ground are shown at the a.c. voltage supply source ACS, the load LL, the low-pass filter LPF, the threshold circuit TC and the relay coils SR1 and SR2. The direct current circuits (CC2, DC2, CC1, S1, DC1, CC2) and (CC2, DC2, CC1, S2, CC2) may have a point connected to ground, for example the terminal A, but they must then further be free from ground for direct current. In the manner described the supply system of FIG. 1 comprises a safety circuit (CI, TC, S, S1, SR1, IA, S2, SR2) or (CITSR) in which the low-pass filter LPF may advantageously be further included.

To explain the operation of the safety circuit CITSR the situation shown in FIG. 1 will be taken as the starting point. There is a connected cable connection DCC and the switches S1 and S2 are respectively closed and open. The direct current source I applies the current denoted by I to the terminal B and then to the terminal A via the direct current circuit (CC2, DC2, CC1, S1, DC1, CC2) coupled in parallel with the capacitor C. The direct current circuit or path may be considered as substantially a short-circuit so that the DC voltage across the capacitor C is negligible. The a.c. voltage supply source ACS produces between the connecting terminals T1 and T2 the a.c. voltage ACV so that an alternating current which predominantly depends on the magnitude of the load LL thus flows through the capacitor C. The a.c. voltage drop across the capacitor C occurs between the terminals of the low-pass filter LPF, which has a passband which is located below the AC supply voltage frequency, so that a small ripple voltage occurs between the terminals of the threshold circuit TC. This ripple voltage is below the threshold value of the threshold circuit TC. The relay coil SR1 is in the energized state so that the switch S1 is closed and the relay coil SR2 is in the nonenergized state so that the switch S2 is open.

Let it now be assumed that the cable connection DCC is detached or becomes loose. The direct current path (CC2, DC2, CC1, S1, DC1, CC2) is interrupted between the terminals T6 and T8, and T7 and T5. The direct current source I applies the current to the capacitor C, which is charged. As a result thereof the voltage between the terminals B and A increases so that the threshold voltage value of the threshold circuit TC is exceeded. When the threshold value is exceeded, the threshold circuit TC produces such a voltage that on the one hand the relay coil SR2 is energized and the switch S2 is closed and on the other hand the relay coil SR1 is deenergized and the switch S1 is opened. This results in an interruption of the a.c. voltage supply to the connecting cable CC and the short-circuiting of the cable conductors CC1 and CC2 via the switch S2. As a result thereof no a.c. voltage will occur between the terminals T5 and T6. By means of its direct current path the closed switch S2 forms a bypass of the open switch S1 in series with the terminals T1 and T2.

If thereafter the cable connection DCC is attached again, the direct current circuit (CC2, DC2, CC1, S2, CC2) is closed in parallel with the capacitor C, across which circuit the capacitor C discharges. When the decreasing voltage across the capacitor C passes the threshold voltage value of the threshold circuit TC, the situation shown in FIG. 1 is restored so that the a.c. voltage is again applied to the load LL.

Instead of the switches S1 and S2 the single on/off switch S may be used in the a.c. voltage supply source ACS. The switch S is then, for example, included in a primary winding of a transformer of which the coil having the direct current path DC1 is a secondary winding. In this case the a.c. voltage supply source ACS which, for example, comprises several secondary transformer windings is switched off in its totality. When the two switches S1 and S2 are used, the source ACS may supply a.c. voltages between connecting terminals, not shown, while the supply of a.c. voltage to the cable CC is interrupted.

The parallel arrangement CI may be provided between the switch S2 and the terminal T5 or between the terminals T8 and T4 or T7 and T3, instead of in the position shown in FIG. 1. Independent of the position it is ensured that the switches S1 and S2 make or break, respectively the associated direct current circuit. In FIG. 1, the switch S1 is shown as a single pole switch, but it may be constructed as a double pole switch whereby also the connecting terminal T2 is disconnected from the junction between the switch S2 and the terminal A.

If the low-pass filter LPF were not provided a threshold voltage value which is higher than the maximum possible a.c. voltage drop across the capacitor C would be required at the threshold circuit TC. If the low-pass filter LPF is provided, only the smoothed ripple voltage appears at the threshold circuit TC so that at a lower threshold voltage value a faster switch-off of the power supply may occur.

The construction of the power supply system of FIG. 1 comprising the above-described safety circuit CITSR has the advantage that the protection against the occurrence of a high a.c. voltage between unconnected terminals T5 and T6 is independent of the alternating current consumed by the load LL. The load LL which is here, for example, in the form of a television camera may be a camera in the stand-by state which consumes an alternating current which is so low as to be disregarded.

The safety circuit CITSR in the power supply system of FIG. 1 must ensure, independent of the specific construction, that the protection is guaranteed to become operative when the cable connection DCC is detached or becomes loose. A short-circuit or an interruption of a circuit component in the safety circuit CITSR must be signalled so that adequate measures can be taken. FIG. 2 shows a detailed circuit diagram of an internally protected construction of the safety circuit CITSR of FIG. 1.

In FIG. 2, between the terminals A and B of the parallel arrangement CI (FIG. 1), a coil DC1/2 indicates the direct current paths DC1 and DC2, a connection CC1/2 indicates the cable conductors CC1 and CC2 and a closed switch S1/DCC denotes the closed switch S1 and the connected cable connection DCC. Vdc denotes a d.c. voltage drop across the coil DC1/2, the connection CC1/2 and the switch S1/DCC. In FIG. 2, reference numeral 1 denotes a d.c. voltage source which applies with respect to ground a positive d.c. voltage Vs to a terminal 2. The d.c. voltage source 1 comprises, for example, a rectifying and smoothing circuit which is coupled to connecting terminals, not shown, of the a.c. voltage supply source ACS. The terminal 2 carrying the voltage Vs is connected to the terminal B via a resistor 3, the terminal A being connected to ground via a resistor 4. The resistors 3 and 4 have, for example, equal resistance values, as a result of which the terminal B carries a voltage $\frac{1}{2}(Vs+Vdc)$ and the terminal A a voltage $\frac{1}{2}(Vs-Vdc)$. Let it be assumed that the d.c. voltage drop Vdc which has, for example, a value of the order of magnitude of 0.1 V is so low as to be disregarded with respect to the d.c. voltage Vs which is, for example, equal to 12 V. As a result thereof, as shown in FIG. 2, the voltages $\frac{1}{2}(Vs+Vdc)$ and $\frac{1}{2}(Vs-Vdc)$ are substantially equal to $\frac{1}{2}Vs$. The series arrangement between the terminals B and A of the d.c. voltage source 1 and the resistors 3 and 4 forms the direct current source I, which produces the similarly indicated current I through the resistor 3, the coil DC1/2, the connection CC1/2, the switch S1/DCC and the resistor 4.

In FIG. 2, a diode bridge circuit 5 is present between the terminals A and B. The terminal B is connected to the anode and cathode, respectively of the diodes 6 and 7, respectively, and the terminal A is connected to the anode and to the cathode, respectively of the diodes 8 and 9, respectively. The anodes of the diodes 7 and 9 are interconnected in a bridge terminal and are connected to a terminal D. The cathodes of the diodes 6 and 8 are interconnected in a bridge terminal and connected to a terminal E. At the diodes 6, 7, 8 and 9 it is indicated that in the conducting state they have an anode-cathode voltage drop Vd which has a value of, for example, 0.7 V. The terminals E and D are part of a d.c. voltage divider 10 arranged between the terminal 2 and ground and comprises a series arrangement of a resistor 11, a parallel circuit of two Zener diodes 12 and 13 and a resistor 14. The junction point of the resistor 11 and the cathodes of the Zener diodes 12 and 13 provides the terminal E. The junction point of the resistor 14 and the anodes of the Zener diodes 12 and 13 provides the terminal D. At the Zener diodes 12 and 13 the cathode-anode voltage drop is designated by Vzd, where, for example, Vzd=5.6 V. Let it be assumed that the resistors 11 and 14 have equal values, from which it follows that the terminal E carries a voltage $\frac{1}{2}(Vs+Vzd)$ and the terminal D a voltage $\frac{1}{2}(Vs-Vzd)$. The voltage of substantially $\frac{1}{2}$Vs at the terminals B and A produces at the terminals E and D, respectively, a voltage which is approximately 2.8 V higher or lower, respectively than the voltage at the terminals B and A. In these circumstances the diodes 6, 7 8 and 9 in the diode bridge circuit 5 are all non-conducting.

The terminal B is connected via a bypass capacitor 16 for the AC supply voltage frequency (source ACS in FIG. 1) to ground and is connected to the terminal A via a series arrangement of capacitors Ca and Cb, which each have substantially the same capacitance. The junction of the capacitors Ca and Cb is connected to the anode of a diode 17, whose cathode is connected to a d.c. voltage terminal which is connected to ground. The series arrangement of the capacitors Ca and Cb corresponds to the capacitor C of FIG. 1. The provision of the two capacitors Ca and Cb instead of the single capacitor C and the provision of the diode 17 is necessary to enable signaling of a capacitor short-circuit or interruption, as will be further described hereinafter.

The terminal B is connected to ground via a voltage divider comprising two series-arranged resistors 18 and 19, the junction of the resistors being connected to a (−) input of a differential amplifier 20. Likewise, the terminal B is connected to a (+) input of a differential amplifier 23 via a voltage divider (21, 22) formed by resistors 21 and 22. Outputs of the differential amplifiers 20 and 23, are connected to switching signal inputs 24 and 25, respectively, of the switching circuit (S1, SR1, S2, SR2), which has already been described with reference to FIG. 1. A (+) input of the differential amplifier 20 is connected to the terminal A via a series arrangement of three resistors 26, 27 and 28. The (+) input of the differential amplifier 20 and the junctions of the resistors 26, 27 and 27, 28 are connected to the terminal B via capacitors 29, 30 and 31, respectively. The resistors 26, 27 and 28 and the capacitors 29, 30 and 31 form a low-pass filter LPF1 between the terminal A and the (+) input of the differential amplifier 20. Likewise, a low-pass filter LPF2 formed by three resistors 32, 33 and 34 and three capacitors 35, 36 and 37 is present between the (−) input of the differential amplifier 23 and the terminal A. The low-pass filters LPF1 and LPF2 of FIG. 2 correspond to the low-pass filter LPF shown in FIG. 1.

The terminal B is further connected to a (+) input of a differential amplifier 38, a (−) input of which is connected to the terminal E. An output of the differential amplifier 38 is connected via a diode 39 to the (−) input of the differential amplifier 20. The terminal A is further connected to a (−) input of a differential amplifier 40, a (+) input of which is connected to the terminal D. An output of the differential amplifier 40 is connected via a diode 41 to the (+) input of the differential amplifier 23 and via a capacitor 42 to the terminal B. In certain circumstances in which the supply voltage ACV produced by the source ACS is present between the (−) and (+) inputs of the differential amplifier 40, the capacitor 42, the diode 41 and the resistor 21 will operate as a peak rectifier circuit (41, 42, 21).

The differential amplifiers 20, 23, 38 and 40 form part of the threshold circuit TC in which the voltage dividers (18, 19) and (21, 22) define a threshold voltage value.

Of the differential amplifiers 20, 23 and 38, 40, respectively the (+) and (−) inputs, being dissimmilar inputs, are coupled in a corresponding manner to the terminals A, B and the terminals B, E and D, A, respectively.

To explain the operation of the safety circuit CITSR shown in FIG. 2 the starting point is the situation shown in which the switch S1 is closed (the switch S2 is open) and the cable connection DCC is in the connected state so the switch S1/DCC is closed. The voltage drop Vdc is present between the terminals B and A and consequently across the series arrangement of the capacitors Ca and Cb, that is to say across the capacitor C. A voltage $\frac{1}{2}(Vs+Vzd)$ is applied to the differential amplifier 38 and a lower voltage of approximately $+\frac{1}{2}$Vs to its (+) input. The output of the differential amplifier 38 carries a voltage which is less than the voltage at the junction of the resistors 18 and 19, as a result of which the diode 39 is non-conducting. A voltage of approximately $+\frac{1}{2}$Vs is applied to the (−) input of the differential amplifier 40 and a lower voltage $\frac{1}{2}(Vs-Vzd)$ is applied to its (+) input. In the manner described with reference to differential amplifier 38, the output of the differential amplifier 40 carries a voltage at which the diode 41 is cutoff. The voltage of approximately $\frac{1}{2}$Vs present at the terminal A is applied to the (+) input of the differential amplifier 20 and the (−) input of the differential amplifier 23, respectively via the low-pass filters LPF1 and LPF2. Via the voltage divider (18, 19) the voltage of approximately $\frac{1}{2}$Vs present at the terminal B is applied with a reduced value to the (−) input of the differential amplifier 20 so that the output thereof applies, for example, a positive voltage to the switching signal input 24. This results in the situation described in the foregoing is in which the relay SR1 is energized and the switch S1 is closed. Via voltage divider (21, 22) the voltage of approximately $\frac{1}{2}$Vs present at the terminal B is applied with a reduced value to the (+) input of the differential amplifier 23 so that the output thereof applies, for example, a negative voltage or a voltage having the zero value to the switching signal input 25. The situation described in the foregoing is produced in which the relay SR2 is not energized and the switch S2 is open. The supply alternating current consumed by the load LL (FIG. 1) results in an a.c. voltage drop between the terminals A and B, the terminal B being decoupled from ground via the capacitor 16. The low-pass filters LPF1 and LPF2 smooth this a.c. voltage drop to a ripple voltage between the (+) and (−) inputs of the differential amplifiers 20 and 23 which does not exceed the threshold value.

If thereafter the cable connection DCC is detached or becomes loose, which corresponds to the switch S1/DCC of FIG. 2 being opened, the direct current path from the terminal B to the terminal A is interrupted. In the first instance the current I flowing through the resistors 3 and 4 will commence to flow through the capacitor C, i.e. the series-arrangement of the capacitors Ca, Cb, in response to which the capacitor voltage increases. This causes the voltage at the terminal B to increase and the voltage at the terminal A to decrease. After some time the voltage increase at the terminal B and the voltage decrease at the terminal A have proceeded so far that to the (+) inputs of the differential amplifiers 20 and 23, respectively a lower and a higher voltage, respectively, is applied than to the (−) inputs thereof. This results in a zero voltage of a negative voltage and a positive voltage being respectively applied to the switching signal inputs 24 and 25 which causes the switch S1 to be opened and the switch S2 to be closed. It will be obvious that the safety circuit CITSR has performed its switch-off task. For the sake of completeness it should be noted that the voltage increase at the terminal B continues to a voltage $\frac{1}{2}(Vs+Vzd)+Vd$, the diode 6 in the bridge circuit 5 becoming conductive. For the voltage decrease at the terminal A it holds that this decrease continues to a voltage $\frac{1}{2}(Vs-Vzd)-Vd$, the diode 9 in the bridge circuit 5 becoming conductive. The voltage $\frac{1}{2}(Vs+Vzd)+Vd$ and $\frac{1}{2}(Vs+Vzd)$ are then present at the (+) and the (−) input, respectively of the differential amplifier 38. At the output of the differential amplifier a positive voltage occurs which is higher than the voltage at the junction of the resistors 18 and 19 and causes, via the conducting diode 39 the increased voltage at the (−) input of the differential amplifier 20 to increase still further. For the differential amplifier 40 it follows that with the voltage $\frac{1}{2}(Vs-Vzd)$ present at the (+) input and the voltage $\frac{1}{2}(Vs-Vzd)-Vd$ being present at the (−) input, the increased voltage at the (+) input of the differential amplifier 23 also increases still further. It can be seen that the differential amplifiers 38 and 40 improve the change-over action at the differential amplifiers 20 and 23.

Connecting thereafter the cable connection DCC results, via the switch S2 (FIG. 1) which is then in the closed state, in a discharge of the capacitor C (i.e. the series-arrangement of the capacitors Ca, Cb). The diodes 6 and 9 in the bridge circuit 5 are then cut-off, the differential amplifiers 38 and 40 each produce a voltage which is less positive than the voltage determined by the voltage dividers (18, 19) and (21, 22) at the (−) and (+) inputs of the differential amplifiers 20 and 23, or is negative. The diodes 39 and 41 are cut-off and thereafter the differential amplifiers 20 and 23 are switched over to respectively open and close the respective switch S2 and S1.

The embodiments of the safety circuit CITSR of FIG. 1 and FIG. 2 result in closing or opening of the switch S1 accompanied by the opening or closing of the switch S2. This results in an optimum protection. The specific construction of the safety circuit CITSR shown in FIG. 2 further creates the possibility of indicating that one component of predetermined circuit components has become defective due to the fact that a short-circuit or an interruption has been formed. With some exceptions, such an event is indicated by either opening of the switch S1 or closing of the switch S2. In either case the a.c. voltage supply to the terminals T5 and T6 is ended. In the event that there is only a short-circuit between the cable conductors CC1 and CC2 via the switch S2, the a.c. voltage supply source ACS of FIG. 1 will apply its maximum alternating current, which is internally protected from short-circuiting, to the series arrangement of the switches S1 and S2. Opening only of the switch S1 or closing only of the switch S2 interrupts the application of the supply a.c. voltage to the load LL and provides a general indication that the safety circuit CITSR must be repaired. A dual construction of circuit components, as mentioned for the filters LPF1 and LPF2 and for the threshold circuit TC of FIG. 2, is a different feature of the internal protection.

For indicating a circuit defect the d.c. voltage divider 10, the diode bridge circuit 5, the use of the series arrangement of the capacitors Ca and Cb with the diode 17 instead of the single capacitor C, the differential amplifiers 38 and 40 with the respective diodes 39 and 41 and the peak rectifier circuit (41, 42, 21) are of major importance, as will appear from the further description of FIG. 2, which description is not exhaustive. The starting point is a situation in which the cable connection DCC is connected, switch S1 is closed and switch S2 open. The diodes 39 and 41 are cut-off by, for example, negative output voltages of the differential amplifiers 38 and 40. For the sake of simplicity, in the description of the operation of the safety circuit CITSR, compensating currents between the bridge circuit 5 and the d.c. voltage divider 10 will not always be taken into account. These currents affect the adjusted voltage values shown in FIG. 2. In addition, a.c. voltages occurring between the terminals A and B will in principle, but for one exception, not be included in the description.

Short-circuiting the resistor 3 results in a current which increases to the value 2I and in a voltage increase at the terminals B and A. When the terminal B reaches the voltage $\frac{1}{2}(Vs+Vzd)+Vd$, the diode 6 becomes conductive. In this situation the voltage $\frac{1}{2}(Vs+Vzd)+Vd$ occurs at the (+) input of the differential amplifier 38, at whose (−) input the voltage $\frac{1}{2}(Vs+Vzd)$ is present. The resultant (higher) positive output voltage of the differential amplifier 38 renders the diode 39 conductive, causing the (−) input of the differential amplifier 20 to receive a higher voltage than its (+) input, in response to which the switch S1 is opened. Ultimately, the diode 6 being conductive, the voltage Vs occurs at the terminal B, the voltage Vs−Vd at the terminal E, the voltage Vs−2Vdc at the terminal A and the voltage Vs−Vd−Vzd at the terminal D.

An interruption of the resistor 3 results in a voltage decrease at the terminals B and U until the diode 9 becomes conductive. In this situation the voltage $\frac{1}{2}(Vs-Vzd)-Vd$ occurs at the (−) input of the differential amplifier 40 at whose (+) input the voltage $\frac{1}{2}(Vs-Vzd)$ is present. The resulting (higher) positive output voltage of the differential amplifier 40 renders the diode 41 conductive, causing the (+) input of the differential amplifier 23 to receive a higher voltage than its (−) input, in response to which the switch S2 is closed.

A short-circuit of the resistor 4 results in a current which increases to the value 2I and that the 0 V ground potential occurs at the terminal A. The diode 9 is then conductive, causing the terminal D to carry the positive voltage Vd. The terminal B carries the voltage 2Vdc and the terminal E carries the voltage Vzd+Vd. At the differential amplifier 40 the positive voltage Vd occurs at the (+) input and the 0 V ground potential at the (−) input. The resulting higher positive output voltage renders the diode 41 conductive in response to which the switch S2 is closed.

An interruption of the resistor 4 results in a voltage increase at the terminals A and B until the diode 6 becomes conductive. In this situation the voltage $\frac{1}{2}(Vs+Vzd)+Vd$ occurs at the terminal B and the (+) input of the differential amplifier 38 while the lower voltage $\frac{1}{2}(Vs+Vzd)$ occurs at the (−) input of the differential amplifier 38. The resulting higher positive output voltage of the differential amplifier 38 results, via the conducting diode 39 and the differential amplifier 20, in the switch S1 being switched off.

A short-circuit of the resistor 11 results in a voltage Vs at the terminal E and a voltage Vs−Vzd at the terminal D. The diode 9 is then conductive, as a result of which the terminal A carries the voltage Vs−Vzd−Vd. At the differential amplifier 40 the voltage Vs−Vzd occurs at the (+) input and the lower voltage Vs−Vzd−Vd at the (−) input so that the resulting higher positive output voltage causes the switch S2 to close via the diode 41 and the differential amplifier 23.

An interruption of the resistor 11 results in a voltage decrease at the terminals D and E until the diode 6 becomes conductive. In this situaion the voltage ½(Vs+Vdc) occurs at the terminal B and at the (+) input of the differential amplifier 38 while the lower voltage ½(Vs+Vdc)−Vd occurs at its (−) input. The resulting higher positive output voltage of the differential amplifier 38 causes the switch S1 to open via the conducting diode 39 and the differential amplifier 20.

A short-circuit of the resistor 14 results in the 0 V ground potential being present at the terminal D and a voltage Vzd at the terminal E. The diode 6 then conducts, a voltage Vzd+Vd being applied to the (+) input of the differential amplifier 38 and the lower voltage Vzd to the (−) input thereof. This results in the switch S1 being switched off.

An interruption of the resistor 14 results in a voltage increase at the terminals E and D until the diode 9 becomes conductive. In this situation the voltage ½(Vs−Vds) occurs at the terminal A and at the (−) input of the differential amplifier 40 and the higher voltage ½(Vs−Vdc)+Vd at the terminal D and at the (+) input of the differential amplifier 40. The switch S2 thus is closed via the differential amplifier 40, the diode 41 and the differential amplifier 23.

A short-circuit of the Zener diode 12 or 13 results in a voltage ½Vs at the terminals D and E. The terminals B and A then carry the respective voltages ½(Vs−Vdc) and ½(Vs−Vdc). In the event that the voltage ½Vdc exceeds the voltage Vd the diodes 6 and 9 become conductive. Independent thereof the (+) inputs of the differential amplifiers 38 and 40 receive a higher voltage (½Vdc or Vd when the diodes 6 and 9 are conductive) so that now the switch S1 is switched-off and the switch S2 is switched-on, which provides one of the above-mentioned indicating exceptions.

If, instead of the two parallel arranged Zener diodes 12 and 13, one single Zener diode were present, an interruption thereof would not be detected. Namely, the terminal E would start carrying the voltage Vs and the terminal D would be at the ground potential. The (−) inputs of the differential amplifiers 38 and 40 then carry a higher voltage than the (+) inputs. To overcome for the absence of an indication in the case where a sole Zener diode is interrupted, the parallel arrangement of the two Zener diodes 12 and 13 has been provided. One of these two Zener diodes 12 and 13 may now be interrupted without further consequences for the safety circuit CITSR which is thus protected from the effect of one defective circuit component because of its dual construction.

A similar line of reasoning as for the case in which the Zener diode 12 or 13 is interrupted holds for the bridge circuit 5. The function of the above-described conducting diode 6 or 9 may be taken over, in the event of an interruption, by the diode 8 or 7, respectively in series with the direct current path across which the voltage drop Vdc occurs.

A short-circuit of the diode 6 results in equal voltages at the (+) and (−) inputs of the differential amplifier 38 and a short-circuit of the diode 9 has the same result for the differential amplifier 40. The differential amplifier 38 or 40 is then adjusted to a predetermined state in which a (higher) positive amplifier output voltage will occur so that the switch S1 or S2 is switched off or switched on, respectively.

With a short-circuit of the diode 7 the terminal D is connected via the terminal B and the direct current path across which the voltage drop Vdc occurs to the (−) input of the differential amplifier 40, to whose (+) input a higher voltage is applied, so that the switch S2 is switched on.

A short-circuit of the diode 8 results in the (+) input of the differential amplifier 38 being connected to its (−) input via the terminal B, the direct current path across which the voltage drop Vdc occurs and the terminal E. The higher voltage at the (+) input of the differential amplifier 38 results in the switch S1 being switched off.

If one single capacitor C were present a short-circuit thereof would make the protection from detaching or loosening of the cable connection DCC inoperative. In this case the current source I will not produce across the short-circuited capacitor C a voltage which exceeds the threshold voltage value in the event of a loose cable connection DCC.

The use of the two (equal) capacitors Ca and Cb and the diode 17 causes, in the event of a short-circuit of the capacitor Ca, in the first instance a voltage decrease at the terminals B and A until the diode 9 becomes conductive, a short-circuit of the capacitor Cb directly resulting in the voltage decrease at the terminal A. In both cases a voltage ½(Vs−Vzd) is present on the (+) input of the differential amplifier 40 and a lower voltage ½(Vs−Vzd)−Vd at the (−) input thereof, so that the switch S2 is switched on. When the capacitor Ca or Cb is short-circuited the voltage Vd produced by the diode 17 ultimately occurs at the terminals B and A, respectively.

An interruption of the capacitor Ca or Cb (or of the sole capacitor C) produces an increase in impedance between the terminals A and B. This impedance increase results in an increased a.c. voltage drop between the terminals A and B (FIG. 1). If the load LL which is in the form of a television camera is, for example, in a stand-by condition in which a minimal power is taken from the a.c. voltage supply source ACS, the a.c. voltage drop between the terminals A and B might increase to subsantially the a.c. supply voltage value. This is prevented from occurring by the combined action of the diode bridge circuit 5, the Zener diodes 12 and 13, the differential amplifier 40 and the peak rectifier circuit (41, 42, 21). The increasing a.c. voltage drop between the terminals A and B results for a positive terminal A in a current path comprised of the diode 8, the Zener diodes 12 and 13 and the diode 7 to the terminal B becoming conductive. When the terminal B is positive there is a conductive current path to the terminal A via the diode 6, the Zener diodes 12 and 13 and the diode 9. This produces a square-wave a.c. voltage having the a.c. supply voltage frequency between the (+) and the (−) input of the differential amplifier 40. The (+) input of the differential amplifier 23 receives a higher positive d.c. voltage via the peak rectifier circuit (41, 42, 21), in response to which the switch S2 is switched-on. For the sake of completeness it should be noted that the differential amplifier produces a square-wave a.c. voltage, the switch S1 being alternately switched on and off.

The use of the diode bridge circuit 5 provides a protection from impermissibly high voltages occurring at the terminals A and B, as the voltage at the terminal B or A cannot become higher than the voltage ½(Vs+Vzd)+Vd as then the diode 6 or 8 becomes conductive. The diode voltage drop Vd is then present as a maximum value between the (+) and (−) inputs of the differential amplifiers 38 and 40.

If the low-pass filter LPF1 or LPF2 becomes defective this results, irrespective of the cause of the defect, in the switch S2 being switched on or the switch S1 being switched off via the other filter LPF2 or LPF1 and the subsequent differential amplifier 23 or 20.

It is apparent from the foregoing that indicating a defective circuit component in the safety circuit CITSR predominantly occurs by a d.c. voltage measurement at the differential amplifiers 38 and 40. For this indicating purpose the a.c. supply voltage ACV is used when the capacitor C or one of the two capacitors Ca and Cb is interrupted, or one of the low-pass filters LPF1 and LPF2 becomes defective.

FIG. 3 shows a circuit diagram of a power supply system in which, after the safety circuit CITSR has become operative, a short-circuit at the loose cable connection DCC does not result in the occurrence of a dangerously high a.c. voltage between the terminals T5 and T6. Components already described with reference to FIGS. 1 and 2 are given the same or comparable references in FIG. 3. In FIG. 3, T3=T7 and T4=T8 indicate that the terminals T3 and T7, and T4 and T8, respectively coincide. Two Zener diodes 50 and 51 are arranged with opposite conductivity directions in series between the switch S2 and the terminal A. A short-circuiting switch S1b, which together with a switch S1a forms a dual switch S1, is arranged in parallel with the Zener diodes 50 and 51. The switches S1a and S1b are complementary and operate as an on-off and off-on switch, respectively. The variable a.c. voltage ACV to be supplied by the controllable a.c. voltage supply source ACS between the terminals T1 and T2 may have, for example, the values 0 V, 30 V or 700 V. Of the parallel arrangement CI there are shown the capacitor C, which may, for example, comprise the series arrangement of the capacitors Ca and Cb of FIG. 2, and the direct current source (I) comprising the d.c. voltage source 1 and the resistors 3 and 4. The diode bridge circuit 5, the d.c. voltage divider 10 and the differential amplifiers 38 and 40 of FIG. 2 may be present. The terminals A and B are connected via the low-pass filter LPF to the threshold circuit TC, both of these components having the dual construction as described with reference to FIG. 2. The threshold circuit TC has two outputs connected to the switching signal inputs 24 and 25 of the switching circuit (S1, SR1, S2, SR2). The switching signal input 25 is connected via a diode 52 to the relay coil SR2 which is also connected to the cathode of a further diode 53. Signals AS, BS and CS, respectively, are indicated at the inputs 24 and 25 and at the cathodes of the diodes 52 and 53, respectively. FIGS. 4a, 4b and 4c show time diagrams as a function of the time t of inter alia the signals AS, BS and CS. H and L at the signals AS, BS and CS which are plotted as voltage variations denote a higher and a lower voltage value corresponding, for example, to a logic 1 and 0 as is indicated at a signal DS, still to be described, by H=1 and L=0. In addition, a variation of the values (0, 30 and 700 V) of the variable a.c. voltage ACV is plotted in the time diagram of FIGS. 4a, 4b and 4c. Thick lines in the time diagram (DCC, S1a, S1b, S2) indicate that the cable connection DCC is in the connected state and the switch S1a, S1b or S2 is closed. Thin lines indicate that the cable connection DCC has been detached or come loose and that the switch S1a, S1b or S2 is open. In the time diagram in FIG. 4c, which is associated with the cable connection DCC, a thick line provided with dots represents a short-circuit between the terminals T5 and T6 (FIG. 3). In FIG. 4a t1 to t6, inclusive, denote some instants which are important in the description of the operation of the supply system shown in FIG. 3. Similarly, some important instants are denoted in FIG. 4b by t7 to t12, inclusive. Instead of the signal variation shown in FIG. 4b it is possible that the signal variation shown in FIG. 4c occurs. In FIG. 4c t7' to t12', inclusive denote instants corresponding to those of FIG. 4b, whereafter specific instants t13 and t14 follow. In FIGS. 4a, 4b and 4c CT1, CT2, ET, GT and ACT indicate periods such as time delays. Before the signal variation shown in FIGS. 4a, 4b and 4c will be described in detail, the structure of the power supply system of FIG. 3 will first be described.

In FIG. 3 the signals AS and CS are applied to a pulse generator 54. The pulse generator 54 produces the signal DS with a brief pulse when an ascending pulse edge is present in the signal AS or in the signal CS, as the case may be. In FIGS. 4a, 4b and 4c these ascending pulse edges in the signals AS and CS are indicated by means of an arrow tip. In FIG. 3 the signal DS is applied to an input of an OR-gate 55, which produces a signal ES at an output. The signal ES is applied directly and via a delay device 56 to inputs of an OR-gate 57. The delay device 56 operates as a pulse lengthening device because of the fact that when ascending pulse edges are allowed to pass directly descending edges in the signal ES are passed with a time delay equal to ET. The gate 57 has an output which applies a signal GS to a control input of the a.c. voltage source ACS and also to a delay device 58. The delay device 58 operates, similar to the device 56, as a pulse lengthening device which at an output thereof results in a signal HS in which the descending pulse edges occur with a time delay GT with respect to the descending pulse edges in the signal GS. The output of the device 58 is connected to an input of an AND-gate 59, which has an output for supplying a signal JS. The signal JS is applied to an input of the gate 55. The signal JS is the result of the signal HS applied to the gate 59 and a further signal KS to be applied thereto. In FIGS. 4a, 4b and 4c the logic OR-processing operation is denoted by the signals $ES=DS+JS$ and $GS=ES+FS$ and the logic AND-processing operation is indicated by the signal $JS=HS\cdot KS$.

The signal KS is the output signal of a series arrangement formed by a peak rectifier circuit 60, a threshold circuit 61 and a delay device 62. Two terminals of the circuit 60 are connected to the connecting terminals T1 and T2 of the a.c. voltage source ACS. At the threshold circuit 61 it is shown by way of example that it has a threshold voltage value of 20 V. The delay device 62 has a time delay ACT for ascending and descending signal edges at the output of the threshold circuit 61. The signal KS is not only applied to the gate 59, but it is also applied directly to a control input of the a.c. voltage source ACS and via an inverter 63 to the anode of the diode 53. In FIGS. 4a, 4b and 4c the inverted signal KS is indicated by LS=$\overline{KS}$. For the sake of completeness it should be noted that the signal CS is the result of an OR-processing operation by means of the diodes 52 and 53, so that it follows that $CS=BS+LS$, which is important for the time diagrams of FIGS. 4b and 4c.

In FIG. 3 the a.c. voltage source ACS is in the form of a controllable a.c voltage source which is controlled by the signals GS and KS. The following logic Table is given by way of example:

TABLE

| GS | KS | AC V |
|----|----|------|
| 0  | 1  | 700 V |
| 1  | 1  | 0 V |
| 1  | 0  | 0 V |
| 0  | 0  | 30 V |

To explain the operation of the safety circuit CITSR of FIG. 3 which has, relative to the construction shown in FIGS. 1 and 2, the additional circuit components S1b and 50 to 63, inclusive, FIG. 4a will be the starting point. Prior to the instant t1 the cable connection DCC is in the connected state, switch S1a is closed and the switches S1b and S2 are open. FIG. 3 shows this situation. When the logic 0 is present in the signal GS and the logic 1 in the signal KS, the source ACS produces the high supply a.c. voltage ACV=700 V between the terminals T1 and T2. The load LL is then supplied with power. The current I flows through the resistor 3, a direct current path (CC2, DC2, CC1, S1a, DC1, CC2) and the resistor 4.

At the instant t1 of FIG. 4a the cable connection DCC is interrupted for some reason or another. This causes the capacitor C of FIG. 3 to be charged by the current I flowing through the resistors 3 and 4. After a capacitor charging period CT1 the threshold voltage value of the threshold circuit TC is reached, whereafter the threshold circuit TC is energized and at the instant t2 the descending pulse edge occurs in the signal AS and the ascending pulse edge in the signal BS. In response thereto the switch S1a is opened and the switches S1b and S2 are closed. Ascending pulse edges are then present in the signals CS, DS, ES, FS, GS, HS and JS. As a result thereof it now holds that GS=1 and KS=1 so that, in accordance with the logic Table, the a.c. voltage source ACS produces a voltage ACV=0 V. In the threshold circuit 61 the threshold voltage value of 20 V is now exceeded, in response to which, after the time delay ACT of the device 62, the logic 0 occurs at the instant t3 in the signal KS and furthermore in the signals JS and ES. From the instant t3 GS=1 and KS=0 so that, in accordance with the logic table, ACV=0 V, which voltage value is already present.

After the time delay ET the descending pulse edge in the signal ES occurs in the signal FS, i.e. at the instant t4, and also in the signal GS. At the instant t4 GS=0 and KS=0 so that, in accordance with the logic table, ACV=30 V. After the time delay GT the descending pulse edge in the signal GS appears in the signal HS, at the instant t5. Thereafter, after the time delay ACT produced by the device 62, an ascending pulse edge occurs in the signal KS at the instant t6 as shortly after the instant t4 the threshold voltage value of 20 V is exceeded in the threshold circuit 61. From the instant t6 it holds that GS=0 and KS=1 so that, in accordance with the logic table, ACV=700 V. The switch S1a is in the open state.

It can be seen that after an interruption of the cable connection DCC, switch S1a is opened and the a.c. voltage ACV is immediately adjusted from 700 V to 0 V, is thereafter stepped up again to 30 V and thereafter to 700 V. As a result, the connecting cable CC is disconnected via the switch S1a so that the a.c. voltage source ACS can indeed apply to further loads, not shown, the high a.c. supply voltage ACV having a value of 700 V, or a different value. In this situation there is a cut-off period equal to 2ACT+ET. By way of example, ACT=0.3 s and ET=1 s, which results in a permissible cut-off period of 1.6 s. Additional examples may be examples in which GT=0.2 s and CT1=0.3 s. For the time delay GT it holds that it must be less than a time delay ACT to prevent the gate 59 from producing the logic 1 in the signal JS at the instant t6. Hereinafter it will be apparent that it is desirable that the capacitor discharge period CT1 be less than or equal to the time delay ACT (FIG. 4c).

FIG. 4b shows the time diagrams for the case where the cable connection DCC is connected again and the load LL is connected to the cable conductors CC1 and CC2. Prior to the instant t7 of FIG. 4b the situation prevails as described after the instant t6 of FIG. 4a. At the instant t7 the cable connection DCC is connected again. After a capacitor discharging period CT2 for discharging the capacitor C of FIG. 3 across a direct current circuit or path (CC2, DC2, CC1, S2, S1b, CC2) now formed, there occurs at the instant t8 the ascending pulse edge in the signal AS and the descending pulse edge in the signal BS. The ascending pulse edge in the signal AS results, via the signals DS and ES, in a logic 1 in the signal GS. The switch S1a is closed and the switch S1b is opened via the relay coil SR1. In response to the descending pulse edge in the signal BS at the instant t8 the switch S2 is opened via the relay coil SR2. From the instant t8 it holds that GS=1 and KS=1 so that, in accordance with the logic Table, ACV=0 V. At the instant t9 a descending pulse edge occurs in the signal KS via the peak rectifier circuit 60, the threshold circuit 61 and the delay device 62 which produces the time delay ACT. In this situation the signal LS=$\overline{KS}$ produces an ascending pulse edge in the signal CS at which the switch S2 is closed via the relay coil SR2 and, without further consequences, the brief pulse occurs in the signal DS. As from the instant t9 it holds that GS=1 and KS=0, it follows from the logic Table that: ACV=0 V.

The same description as given for the instants t4 and t5 of FIG. 4a holds for the instants t10 and t11 of FIG. 4b. From the instant t10 the voltage ACV=30 V occurs between the terminals T1 and T2 and consequently across the closed switch S2 and the Zener diodes 50 and 51 of FIG. 3. A threshold voltage of, for example, 35 V is associated with the series arrangement of the Zener diodes 50 and 51, so the Zener diodes 50 and 51 are non-conducting.

After the time delay ACT produced by the delay device 62, there now occur at the instant t12 the logic 1 in the signal KS and the logic 0 in the signal LS=$\overline{KS}$. This results in the switch S1B being opened via the signal CS and the relay coil SR2 and as it now holds that GS=0 and KS=1, it follows in accordance with the logic Table that ACV=700 V. It can be seen that the time diagrams shown in FIG. 4b are associated with a re-connection of the cable connection DCC to the load LL.

The time diagrams of FIG. 4c apply to the situation in which the terminals T5 and T6 of FIG. 3, which are in the unconnected state, are short-circuited for some reason or another. In FIG. 4c this short-circuit is shown by means of the line provided with dots at DCC. FIG.

4c shows the instants t7', t8', t9' and t10', which fully correspond with the situations and events at the instants t7 to t10, inclusive of FIG. 4b. After the instant t10', the a.c. voltage ACV does not however increase from 0 V to 30 V, as should follow from GS=0 and KS=0 in the logic Table, but to a value which is lower than the threshold voltage value of 20 V of the threshold circuit 61, more specifically owing to the short circuit between the terminals T5 and T6. As a result thereof the instant t12' passes unnoticed. In this situation it must be assumed that the a.c. voltage source ACS has such an internal resistance that in this situation the alternating current flowing does not reach the turn-off value of an internal short-circuit protection.

Let it be assumed that at the instant t13 the short-circuit between the terminals T5 and T6 is removed (DCC). Thereafter the a.c. voltage ACV increases to 30 V, while simultaneously the capacitor C is charged by the current I in the capacitor charging period CT1. At the instant t14, in response to charging of the capacitor C, the descending pulse edge occurs in the signal AS as a result of which the switch S1a is opened and the switch S1b is closed via the relay coil SR1. In addition, via the delay device 62 producing the time delay ACT, a logic 1 occurs in the signal KS at the instant t14, GS=0 and KS=1 resulting, in accordance with the logic Table, in ACV=700 V. After the instant t14 of FIG. 4c the safety circuit CITSR is in the state as described after the instant t6 of FIG. 4a.

In FIG. 4c it is shown for the periods of time CT1 and ACT that they are equal after the instant t13. If the capacitor charging period CT1 is shorter than the period ACT, the switch S1a is switched off before the a.c. voltage ACV=700 V is produced between the terminals T1 and T2 of the a.c. voltage source ACS. Both possibilities may be used in practice.

It can be seen that the controlled a.c. voltage supply source ACS of FIG. 3 supplies the low a.c. voltage ACV=30 V in order to make it possible to detect whether a load LL which is high-ohmic for the a.c. voltage frequency is connected to the cable conductors CC1 and CC2 of the connecting cable CC or whether, instead thereof, a low-ohmic short-circuit is present between the cable conductors CC1 and CC2. The result is that the high a.c. voltage ACV of 700 V can only occur between the cable conductors CC1 and CC2 if the condition is satisfied that the direct current path between the terminals A and B is closed and the applied low a.c. voltage ACV of 30 V does not stay below 20 V owing to a short-circuit.

In the description of the safety circuit CITSR as shown in FIG. 2 the internal protection from defective circuit components is described in detail. The same internal protection may be used in the circuit CITSR of FIG. 3. A proper operation of the threshold circuit 61 and the delay device 62 is essential for the circuit CITSR of FIG. 3. If the logic 0 is present in the signal GS it must only be possible for the logic 1 to occur in the signal KS (GS=0, KS=1, ACV=700 V) when the threshold voltage value of 20 V is exceeded in the proper manner and that after the time delay ACT. Measures against possible faults can be taken at the threshold circuit 61 and the delay device 62. The use of the Zener arrangement of the Zener diodes 50 and 51 and the (closed) switch S2 are a further protection against a dangerously high a.c. voltage between the cable conductors CC1 and CC2.

From the logic Table and the description of the time diagrams of FIG. 4b it follows that the controllable a.c. voltage source ACS produces, under the control of the signals GS and KS with the sequence of logic values (1,1), (1,0), (0,0), (0,1), the a.c. voltage ACV in a distinct sequence of values of 0 V, 0 V, 30 V, 700 V. A dangerous situation might occur when irrespective of the cause of the fault, it would continue to hold from the beginning of the sequence of the signal KS that KS=1. The situation would then become dangerous when the signal GS would pass from the value GS=1 into GS=0. The use of the circuit formed by the AND-gate 59 and OR-gates 55 and 57 results in that from the situation wherein KS=1 and (HS=) GS (=FS=ES=JS)=1 the dangerous situation wherein KS=1, GS=0 cannot directly be obtained by providing a logic gates circuit (59, 55, 57) closed thus between the control inputs of the source ACS with the signals GS and KS, the situation GS=1, KS=1 (1,1) cannot directly pass into the situation GS=0, KS=1 (0, 1). This prevents an inpermissible sequence in the a.c. voltage control from occurring.

With reference to FIGS. 4a to 4b it has been described that the time delay ACT must be longer than the time delay GT or that the instant t6 and t12 must come later than the instant t5 and t11, respectively. If the instant t6 or t12 occurs earlier so that it occurs before the instant t5 or t11, respectively an ascending pulse will occur in the signal JS=HS·KS via gate 59, whereafter the sequence for stepping up the a.c. voltage ACV is started again via the OR-gates 55 and 57 and the delay devices 56 and 58.

In the power supply system shown in FIG. 3 the switch S1 is of a dual construction comprising the switches S1a and S1b, whose switching operations are complementary. The switch S1b is provided as a short-circuit switch for the Zener diodes 50 and 51 to ensure that, during capacitor discharging periods CT2, the capacitor C can discharge via the direct current path (CC2, DC2, CC1, S2, S1b, CC2) when the load LL is connected. In the event of a short-circuit a direct current path (CC2, T6, T5, CC1, S2, S1b, CC2) is present for the discharge. The series arrangement of the Zener diodes 50 and 51 with opposite conductivity directions produce a voltage drop of, for example, 35 V. as a result, the a.c. voltage ACV cannot exceed the safe value of 35 V between the cable conductors CC1 and CC2 when the switches S1a and S2a are in the closed state and switch S1b is open.

What is claimed is:

1. A safety circuit for use in a power supply system including an a.c. voltage supply source, a load and a connecting cable between the source and the load, the connecting cable having two cable conductors coupled to two connecting terminals of the a.c. voltage supply source and the load, respectively, with the cable having a detachable cable connection between the load and the a.c. voltage supply source, the safety circuit being operative to prevent the a.c. supply voltage from occurring between the cable conductors in the event the cable connection is in a non-connected state, the safety circuit comprising a switching circuit which comprises an on/off switch of the power supply system, a parallel arrangement of at least one capacitor and a direct current source connected in a direct current circuit which comprises a direct current path between the connecting terminals of the a.c. voltage supply source and the load, and the cable conductors connected thereto, means coupling said parallel arrangement via a threshold circuit having a threshold voltage value to the switching circuit comprising the on/off switch of the power supply system, said switch being switched on or off, before or after, respectively, the threshold voltage value has been exceeded by the voltage across said parallel arrangement.

2. A safety circuit as claimed in claim 1, wherein said parallel arrangement is coupled to the threshold circuit via a low-pass filter which has a passband located below the AC supply voltage frequency.

3. A safety circuit as claimed in claims 1 or 2, wherein said on/off switch is coupled between the detachable cable connection and at least one of the connecting terminals of the a.c. voltage supply source and the switching circuit comprises a second switch arranged as an off/on switch in parallel with a series arrangement of the first on/off switch and the connecting terminals of the a.c. voltage supply source, the said parallel arrangement of the capacitor and the direct current source being connected in a direct current circuit which comprises the direct current path between the connecting terminals of the load, the second switch and at least a portion of the cable conductors including the detachable cable connection.

4. A safety circuit as claimed in claim 3, characterized in that in said parallel arrangement the direct current source comprises a series arrangement of a first resistor, a d.c. voltage source and a second resistor, the threshold circuit comprising first and second differential amplifiers each having a (+) and a (−) input, means connecting unlike inputs of the first and the second differential amplifiers to the said parallel arrangement via a first and a second low-pass filter, respectively, means connecting the other unlike inputs of the first and second differential amplifiers to said parallel arrangement via a first and a second voltage divider, respectively, for producing a threshold voltage value, and means connecting an output of the first and the second differential amplifiers, respectively, to a first and a second switching signal input, respectively, of the switching circuit and associated with the first and the second switches, respectively.

5. A safety circuit as claimed in claim 4, further comprising a diode bridge circuit connected in parallel with the said parallel arrangement of the capacitor and the direct current source, means connecting two opposite terminals of the bridge circuit to two terminals of a d.c. voltage divider, a third and a fourth differential amplifier each having a (+) and a (−) input, means separately connecting one pair of unlike inputs of the third and fourth differential amplifiers to the said parallel arrangement, means connecting the other pair of unlike inputs of the third and fourth differential amplifiers to first and second terminals in the d.c. voltage divider, respectively, and means connecting outputs of the third and the fourth differential amplifiers via respective diodes to the inputs of the first and second differential amplifiers, respectively, which are connected to the first and second voltage dividers, respectively.

6. A safety circuit as claimed in claim 5, characterized in that the capacitor in the said parallel arrangement comprises a series arrangement of a first and a second capacitor each having substantially the same capacitance, and means connecting a junction of the first and the second capacitor to a d.c. voltage terminal via a diode.

7. A safety circuit as claimed in claim 5, wherein the output of the fourth differential amplifier is connected to an input of the second differential amplifier via a peak rectifier circuit which includes the diode connected thereto.

8. A safety circuit as claimed in claim 4, wherein at least one connection of the said parallel arrangement is connected to a terminal of a bypass capacitor for the AC supply voltage frequency.

9. A safety circuit as claimed in claim 1 wherein the power supply system comprises a controllable a.c. voltage supply source which produces a low a.c. voltage and a high a.c. supply voltage, the low a.c. voltage being present after the cable conductors have been connected to via the threshold circuit and the switching circuit comprising the switch, whereafter the high AC supply voltage is produced after it has been detected, with the low a.c. voltage present and by means of a peak rectifier circuit and a further threshold circuit, that a load which is high-ohmic at the a.c. voltage frequency is connected to the conductors of the connecting cable.

10. A safety circuit as claimed in claim 9, further comprising a delay device connected in cascade with the peak rectifier circuit and the said further threshold circuit, said delay device having a time delay at least equal to a charging period of the capacitor in the parallel arrangement sufficient to reach the threshold voltage value of the threshold circuit.

11. A safety circuit as claimed in claim 10 wherein the controllable a.c. voltage supply source has two control inputs coupled to a closed circuit of logic gates.

12. A safety circuit as claimed in claims 9 or 10, wherein said on/off switch is coupled between the detachable cable connection and at least one of the connecting terminals of the a.c. voltage supply source and the switching circuit comprises a second switch arranged as an off/on switch in parallel with a series arrangement of the first on/off switch and the connecting terminals of the a.c. voltage supply source, the said parallel arrangement of the capacitor and the direct current source being connected in a direct current circuit which comprises the direct current path between the connecting terminals of the load, the second switch and at least a portion of the cable conductors including the detachable cable connection, and further comprising two Zener diodes having opposite conductivity directions connected in series with the second switch, the first switch being of a dual construction including said on/off switch and an off/on switch coupled in parallel with the two Zener diodes.

13. A safety circuit as claimed in claim 1 wherein said source of AC supply voltage comprises a controllable AC voltage source having first and second control inputs, KS and GS, respectively, to control the AC voltage source to produce at its output terminals either zero volts, a high voltage or a low but finite voltage, said safety circuit further comprising, a peak rectifier circuit, a second voltage threshold circuit with a threshold level between zero volts and said low voltage, and a delay device all connected in cascade between output terminals of the AC voltage source and the KS control input, and a logic circuit coupled between the output of the first threshold circuit and the GS control input of the AC voltage source, said logic circuit and AC voltage source being arranged to satisfy the following logic table:

| GS | KS | AC Voltage |
|---|---|---|
| 0 | 1 | High V. |

-continued

| GS | KS | AC Voltage |
|----|----|-----------|
| 1  | 1  | 0 V.      |
| 1  | 0  | 0 V.      |
| 0  | 0  | Low V.    | said cascade combination and said logic circuit being operative, upon an interruption of the connecting cable to the load, to control the controllable AC voltage supply to adjust the AC voltage in steps from said high voltage to zero voltage, then to said low voltage, and thereafter to said high voltage.

14. In an apparatus including a connecting cable for coupling an AC voltage supply source to a remote load, the connecting cable having two cable conductors and a detachable connector for coupling the cable conductors to a pair of terminals of the load, a safety circuit for monitoring the connecting cable to inhibit the application of the AC supply voltage to the cable conductors in the event the connecting cable is detached from the load, said safety circuit comprising: a capacitor and a source of direct current connected in parallel to a direct current circuit that includes the two cable conductors and the detachable connector, a voltage threshold circuit having an input connected to the parallel arrangement of the capacitor and direct current source and an output coupled to a switching circuit means, said switching circuit means being operative to control a first switch that controls the supply of AC voltage from the AC voltage supply source to the connecting cable, said direct current circuit being arranged to be a part of a direct current path that includes a part of the load coupled to the load terminals, a part of the AC voltage supply and said first switch when the connecting cable is connected to the load, the capacitor voltage then being limited by the direct current path to a value below the voltage threshold level of the threshold circuit, and wherein said direct current path is broken when the cable connector is detached from the load whereby the capacitor is allowed to charge up from the direct current source until it develops a voltage that triggers the voltage threshold circuit which in turn operates said switching circuit means to open said first switch and thereby interrupt the supply of AC voltage to the connecting cable.

15. A safety circuit as claimed in claim 14 wherein said switching circuit means is operative to control a second switch, connected across said first and second cable conductors, in a manner such that a second switch is closed when the first switch is open, said second switch being part of a second direct current path that includes the two cable conductors, the cable connector and said part of the load when the cable connector is reconnected after a prior operation of the threshold circuit and the switching circuit means to open and close the first and second switches, respectively, the capacitor then being discharged via the second direct current path to trigger the threshold circuit back to an initial state such that the switching circuit means controls the first and second switches to the closed and open position, respectively, to reapply the AC voltage to the connecting cable.

16. A safety circuit as claimed in claim 15 further comprising a low-pass filter with a pass band below the frequency of the AC supply voltage, and means connecting said low-pass filter between said parallel arrangement and the input of the voltage threshold circuit.

17. A safety circuit as claimed in claim 15 wherein the direct current source comprises a series arrangement of a DC voltage source and first and second resistors, and the threshold circuit comprises first and second differential amplifiers each having a (+) and a (−) input, means connecting one pair of unlike inputs of the first and second differential amplifiers to the capacitor via first and second low-pass filters, respectively, means connecting the other pair of unlike inputs of the first and second differential amplifiers to respective first and second sources of threshold voltage, and means connecting outputs of the first and second differential amplifiers to first and second control inputs of the switching circuit means that control the first and second switches, respectively.

18. A safety circuit as claimed in claim 17 further comprising a diode bridge circuit connected in parallel with the capacitor via a first pair of opposite terminals of the bridge circuit, means connecting a second pair of opposite terminals of the bridge circuit to first and second terminals of a DC voltage divider, third and fourth differential amplifiers each having a (+) and a (−) input with a first pair of the unlike inputs connected across the capacitor and the other pair of unlike inputs connected to said first and second terminals, respectively, of the DC voltage divider, and means connecting outputs of the third and fourth differential amplifiers via first and second diodes, respectively, to the inputs of the first and second differential amplifiers which are connected to the first and second sources of threshold voltage.

19. A safety circuit as claimed in claim 18 wherein said capacitor comprises a first capacitor connected in series with a second capacitor across the source of direct current, said first and second capacitors having the same capacitance, means connecting a junction between the first and second capacitors to a source of DC reference voltage via a diode, and wherein the output of the fourth differential amplifier is connected to said input of the second differential amplifier via a peak rectifier circuit that includes said second diode.

* * * * *

UNITED STATES PATENT AND TRADEMARK OFFICE
CERTIFICATE OF CORRECTION

PATENT NO. : 4,523,248

DATED : June 11, 1985

INVENTOR(S) : PETER C. SCHMALE ET AL

It is certified that error appears in the above-identified patent and that said Letters Patent is hereby corrected as shown below:

Column 23:

Claim 15, line 4, change "a" (second occurrence) to

--the--

Signed and Sealed this

Sixth Day of May 1986

[SEAL]

Attest:

DONALD J. QUIGG

Attesting Officer

Commissioner of Patents and Trademarks